Aug. 5, 1958
J. A. BOSTON
2,845,879
DOUGH SEAM CONTROL
Filed May 29, 1956
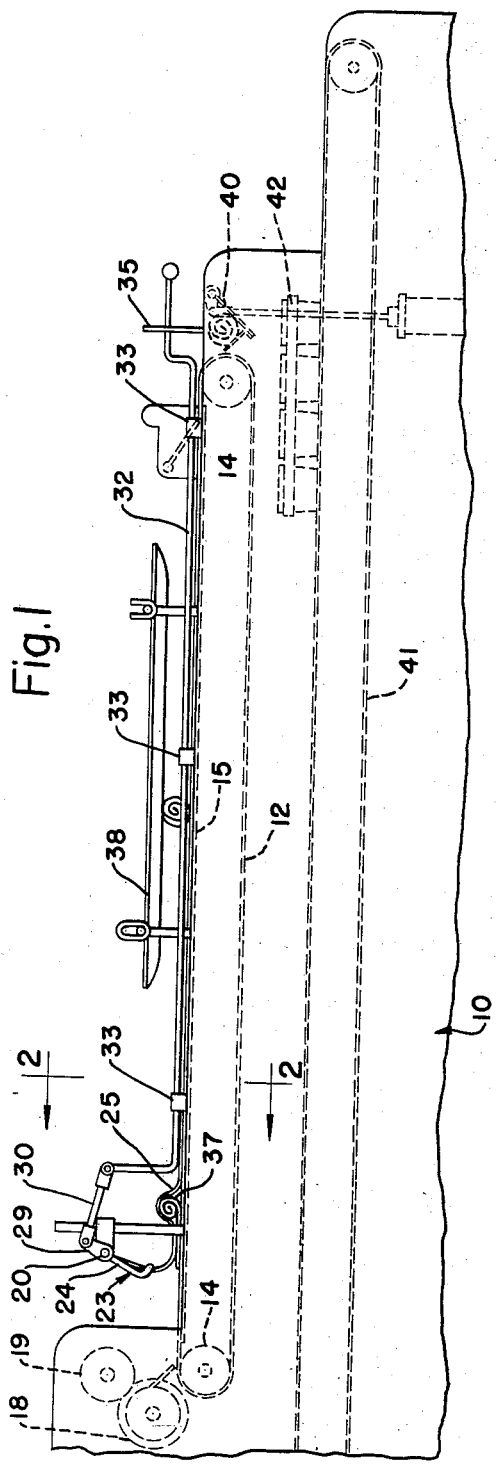
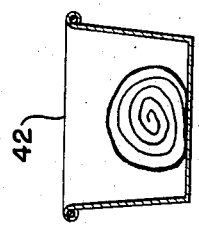
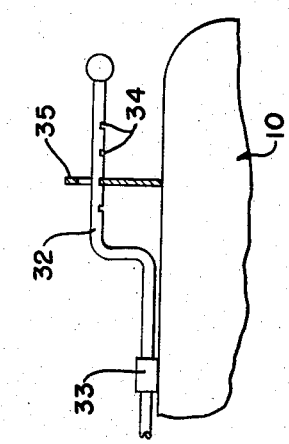
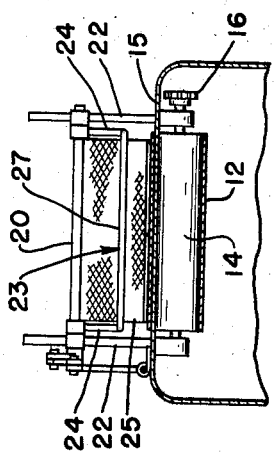
INVENTOR.
John A. Boston
BY
Otto Maelle
Attorney

United States Patent Office 2,845,879
Patented Aug. 5, 1958

2,845,879

DOUGH SEAM CONTROL

John A. Boston, York, Pa., assignor, by mesne assignments, to Capitol Products Corporation, Mechanicsburg, Pa., a corporation of Pennsylvania Application May 29, 1956, Serial No. 587,986

2 Claims. (Cl. 107—9)

This invention relates to an improvement in dough seam control, and more particularly in controlling the curling operation of a strip or sheet of dough in forming moulded loaves so that the seam of the moulded loaf will be or lie on the bottom of the pan when the moulded loaf is deposited in the pan.

The invention consists in providing a device, under the control of the moulder operator, for regulating the positioning and operation of the curler in curling the dough strips so that the seam formed in the moulded loaf will be on the upper side of the loaf when it is delivered to the depositor or disperser at the rear end of the moulder.

In the accompanying drawings:

Figure 1 is a view in side elevation, showing a portion of moulder with a curling device thereon and having means for controlling the operation of the curling device;

Figure 2 is a transverse vertical sectional view in detail of the moulder and showing the curler in rear elevation;

Figure 3 is a detail view in side elevation of the operating rod for the curler; and Figure 4 is a view in section of a dough pan with a curled dough loaf in the pan, and showing the seam of the dough loaf resting on the bottom of the pan.

In the drawing 10 designates the moulder provided with a traveling endless belt 12 mounted on rollers 14 at each end thereof, which rollers are preferably supported beneath the top or deck 15 of the moulder. A gear 16 is provided on one of the rollers 14 and is adapted to be connected to a suitable source of power (not shown) for driving the belt 12.

The upper run of the belt 12 traverses the upper surface of the top or deck 15, and the upper end thereof is disposed in a position to receive dough sheets or strips thereon issuing from the sheeting rolls 18 and 19, shown in dotted lines.

The curling device or curler, consists of a rotatable shaft 20 extending transversely of the top 15 of the moulder and is adjustably supported on posts 22 mounted on the top 15. A U-shaped frame 23 has the legs 24 thereof connected to the shaft 20 so that the frame 23 may be rotated upon the rotation of the shaft 20. A curling mat or fabric 25, comprising preferably, a strip of fine wire mesh fabric, has one end thereof attached to the shaft 20, and the sides thereof disposed between the legs 24 of the frame 23. The curling mat drapes or passes around the cross bar 27 of the frame 23, with the free end of the curling mat extending a suitable distance rearwardly of the moulder along the belt 12. The cross bar 27 is offset rearwardly and located at right angles to the legs 24 to insure the curling mat is properly positioned on the upper run of the belt 12.

Connected to the shaft 20 is a rocker arm 29 and to which a link 30 is pivoted. The link 30 is pivoted to an operating rod 32, which is mounted for sliding movement on the top 15 and held thereon by clips 33. The inner end of the rod 32 is located adjacent the discharge end of the belt 12 in a position for engagement by the operator for oscillating the curler. The rod is provided with a plurality of notches 34 for engagement with a standard 35 for retaining the rod and curler in adjusted relationship after initiating the curling operation of the dough strip.

The operator upon reciprocating the rod 32 can cause the curler frame 23 to be oscillated to position the curling mat 25 with respect to the leading edge of the dough strip 37 to start and cause the dough strip to be rolled or curled upon itself, as indicated in Fig. 1, so that the dough strip will have the leading edge thereof in the center of the dough roll loaf and its rear edge will be on the outer side of the dough roll loaf and providing a seam lengthwise of the dough loaf. The dough loaf upon leaving the curling mat 25, as it is carried rearwardly by the belt 12, will pass beneath a pressure board 38 suitably supported on the top 15 above the belt 12. The pressure board 38 may be of any conventional form and will subject the dough loaf to the required pressure and kneading action. The dough loaf eventually will be deposited by the belt 12 into a trough-like dispenser 40 located at the rear end of the belt 12.

Located beneath the belt 12 is an endless belt 41, shown in dotted lines, for conducting pans 42, dotted lines, Fig. 1, beneath the dispenser 40. The operation of the dispenser 40 for delivering the dough loaves to the pans 42 is disclosed in Rhodes Patent 2,590,823 of March 25, 1952, and does not form a part of this invention.

By manipulating the curler frame 23 by the rod 32, the operator can position the curler mat 25 with respect to the leading edge of the dough sheet 37, so that a seam will be formed on the outer surface of the dough loaf by the rear or trailing edge of the dough sheet. In this manner, the operator can vary the initiation of the start or beginning of the curling of the dough sheet, so that the seam on the outer surface of the dough loaf will be, or substantially, at the top of the dough loaf when the dough loaf is received in the depositor 40, and when the depositor is tripped it will deliver the dough loaf to the pan 42, with the outer seam on the lower side of the dough loaf and the seam engaging the bottom of the pan 42, Fig. 4.

It will be appreciated that by the rod 32 the frame 23 may be swung to different angles and held by the engagement of the standard 35 with the notches 34 of the rod, and thereby elevate or lower the mat 25 to vary or change the initial starting engagement between the leading edge of the dough sheet in establishing the curling of the dough sheet as it is being fed longitudinally of the moulder by the belt.

I claim:

1. In a moulder comprising an endless horizontally traveling belt for transporting dough sheets lengthwise therealong, a pivoted curler frame mounted on said moulder and extending transversely of said belt in superposed spaced relation with respect thereto, a curling mat having an end thereof suspended from said frame above said belt and having a pendent forward portion and a terminal portion resting on said belt extending in the direction of travel of said belt, said terminal portion having a length to roll said dough sheets into cylindrical coils with the trailing edge portion of the dough sheets forming external seams and to turn said cylindrical coils on their axes as they are transported under said terminal portion by said belt, said frame having a frame member offset from the pivotally mounted end of said frame engaging the pendent portion of said mat, and means for pivoting and retaining said frame in any one of a number of pivotally adjusted positions to vary the vertical extent of the pendent portion of said mat and the extent of engagement of the terminal portion of said mat with said belt, thereby to vary the extent of rotation of the cylindrical coils of dough on their own axes for maintaining a constant peripheral location of said external seams at the discharge end of said belt under varying conditions of operation.

2. A device in accordance with claim 1, wherein said last named means includes a rocker arm rigidly associated with the pivoted end of said curling frame, longitudinally slidable linkage means supported by said moulder pivotally attached at one end to the free end of said rocker arm and extending to the discharge end of said belt, and means securing said longitudinally slidable linkage means in any one of a number of adjusted positions, whereby the position of said curling mat may be remotely controlled from the discharge end of said belt.

References Cited in the file of this patent

UNITED STATES PATENTS

| | | |
|---|---|---|
| 2,631,550 | Rhodes | Mar. 17, 1953 |
| 2,725,827 | Stickelber | Dec. 6, 1955 |

FOREIGN PATENTS

| | | |
|---|---|---|
| 72,003 | Norway | Apr. 28, 1947 |